(12) United States Patent
Kafle et al.

(10) Patent No.: US 10,772,111 B2
(45) Date of Patent: Sep. 8, 2020

(54) INTERFERENCE MANAGEMENT IN WIRELESS NETWORK

(75) Inventors: Padam Kafle, Coppell, TX (US); Mika Kasslin, Espoo (FI); Prabodh Varshney, Coppell, TX (US)

(73) Assignee: Nokia Technologies Oy, Espoo (FI)

( * ) Notice: Subject to any disclaimer, the term of this patent is extended or adjusted under 35 U.S.C. 154(b) by 395 days.

(21) Appl. No.: 14/116,520

(22) PCT Filed: Mar. 29, 2012

(86) PCT No.: PCT/FI2012/050308
§ 371 (c)(1),
(2), (4) Date: Nov. 8, 2013

(87) PCT Pub. No.: WO2012/156574
PCT Pub. Date: Nov. 22, 2012

(65) Prior Publication Data
US 2014/0086212 A1     Mar. 27, 2014

Related U.S. Application Data

(60) Provisional application No. 61/485,768, filed on May 13, 2011.

(51) Int. Cl.
*H04W 72/12* (2009.01)
*H04B 17/345* (2015.01)
(Continued)

(52) U.S. Cl.
CPC ...... *H04W 72/1205* (2013.01); *H04B 17/345* (2015.01); *H04W 74/085* (2013.01);
(Continued)

(58) Field of Classification Search
CPC .......... H04W 28/044; H04W 72/1205; H04W 28/048; H04W 28/18; H04W 28/26; H04W 84/12; H04W 88/08
See application file for complete search history.

(56) References Cited

U.S. PATENT DOCUMENTS 8,619,634 B2 * 12/2013 Meier ................ H04W 72/082
370/256
9,276,795 B2 * 3/2016 Vermani ............. H04L 27/2649
(Continued)

FOREIGN PATENT DOCUMENTS

WO         2009023581      2/2009

OTHER PUBLICATIONS

International Search Report received for corresponding Patent Cooperation Treaty Application No. PCT/FI2012/050308, dated Jul. 5, 2012, 5 pages.

(Continued)

*Primary Examiner* — Redentor Pasia
(74) *Attorney, Agent, or Firm* — Harrington & Smith (57) ABSTRACT

Interference management in a wireless network is disclosed in this document. Two networks with overlapping frequency bands and coverage areas are configured to cooperate in order to mitigate mutual interference. Some embodiments relate to medium reservation in a first network to protect a transmission in a second network, while other embodiments relate to aligning communication parameters between the networks.

22 Claims, 3 Drawing Sheets

(51) Int. Cl.
*H04W 74/08* (2009.01)
*H04W 28/26* (2009.01)
*H04W 84/12* (2009.01)
*H04W 88/08* (2009.01)
*H04W 28/18* (2009.01)
*H04W 28/04* (2009.01)

(52) U.S. Cl.
CPC ............ *H04W 28/04* (2013.01); *H04W 28/18* (2013.01); *H04W 28/26* (2013.01); *H04W 84/12* (2013.01); *H04W 88/08* (2013.01)

(56) References Cited

U.S. PATENT DOCUMENTS

| | | | |
|---|---|---|---|
| 2005/0191964 A1 | 9/2005 | Hundal | |
| 2008/0165732 A1 | 7/2008 | Kim et al. | |
| 2009/0268674 A1* | 10/2009 | Liu | H04W 72/02 370/329 |
| 2010/0202391 A1 | 8/2010 | Palanki et al. | |
| 2011/0319114 A1* | 12/2011 | Tavildar | H04W 16/14 455/514 |
| 2013/0034091 A1* | 2/2013 | Kim | H04W 72/0453 370/338 |
| 2013/0058247 A1* | 3/2013 | Chen | H04W 72/1215 370/252 |

OTHER PUBLICATIONS

Written Opinion received for corresponding Patent Cooperation Treaty Application No. PCT/FI2012/050308, dated Jul. 10, 2012, 8 pages.

Salami G. et al. "A comparision between the centralized and distributed approaches for spectrum management." IEEE Communications Surveys & Tutorials. 2011, vol. 13, No. 2, pp. 274-290. May 5, 2011.

* cited by examiner

INTERFERENCE MANAGEMENT IN WIRELESS NETWORK

RELATED APPLICATION

This application was originally filed as PCT Application No. PCT/FI2012/050308 filed Mar. 29, 2012, which claims priority to U.S. Provisional Application No. 61/485,768, filed May 13, 2011.

FIELD

The invention relates to the field of wireless communications and, particularly, to interference control in a wireless network.

BACKGROUND

In many areas, availability of communication channels (frequencies) may be scarce because of other systems already occupying the channels. In order to improve the utilization of the available frequency spectrum, enhanced coexistence techniques are being developed. Meanwhile, different networks may apply different transmission power levels, which results in that a level of interference from transmitters of a high-power network to low-power networks on overlapping channels may be overwhelming. Due to larger coverage areas of lower frequency bands below 1 GHz compared with WLAN in 2.4 or 5 GHz bands, the potential interference area among adjacent networks becomes more challenging even when these networks are utilizing similar power levels. For example, many stations may not be able to hear transmissions from other stations of the same network and located to the far end with some obstructions in between. Therefore, sophisticated coexistence techniques are required.

BRIEF DESCRIPTION

According to an aspect of the present invention, there is provided a method comprising: detecting, in a first access point of a first network of a wireless local area network, presence of a second network on a frequency band overlapping with a frequency band of the first network; configuring the first access point to utilize a distribution system signalling interface to negotiate about transmission medium reservation for a transmission in the first network or the second network so as to avoid transmission collisions between the first network and the second network; and configuring the first access point to utilize a second signalling interface, different from the distribution system signalling interface, to negotiate within the first network.

According to another aspect of the present invention, there is provided a method comprising: detecting, in a network apparatus, presence of a first network and a second network on overlapping frequency bands; detecting that the first network and the second network utilize different radio transmission bandwidths; and in response to the detection of the different radio transmission bandwidths between the first network and the second network, causing at least a first access point of the first network to initiate a procedure to align the radio transmission bandwidths between the first network and the second network.

According to yet another aspect of the present invention, there is provided a computer program product embodied on a computer readable distribution medium configured to carry out any one of the above-described methods. According to yet another aspect, there is provided the computer readable distribution medium storing the computer program product.

According to another aspect of the present invention, there is provided an apparatus comprising at least one processor; and at least one memory including a computer program code, wherein the at least one memory and the computer program code are configured, with the at least one processor, to cause the apparatus to: detect presence of a second network on a frequency band overlapping with a frequency band a first network of a wireless local area network; configure of a first access point of the first network to utilize a distribution system signalling interface to negotiate about transmission medium reservation for a transmission in the first network or the second network so as to avoid transmission collisions between the first network and the second network; and configure the first access point to utilize a second signalling interface, different from the distribution system signalling interface, to negotiate within the first network.

According to another aspect of the present invention, there is provided an apparatus comprising at least one processor; and at least one memory including a computer program code, wherein the at least one memory and the computer program code are configured, with the at least one processor, to cause the apparatus to: detect presence of a first network and a second network on overlapping frequency bands; detect that the first network and the second network utilize different radio transmission bandwidths; in response to the detection of the different radio transmission bandwidths between the first network and the second network, cause at least a first access point of the first network to initiate a procedure to align the radio transmission bandwidths between the first network and the second network.

According to another aspect of the present invention, there is provided an apparatus comprising means for detecting, in a first access point of a first network of a wireless local area network, presence of a second network on a frequency band overlapping with a frequency band of the first network; means for configuring the first access point to utilize a distribution system signalling interface to negotiate about transmission medium reservation for a transmission in the first network or the second network so as to avoid transmission collisions between the first network and the second network; and means for configuring the first access point to utilize a second signalling interface, different from the distribution system signalling interface, to negotiate within the first network.

In an embodiment, the apparatus further comprises means for encapsulating a message related to the negotiation about the transmission medium reservation and transmitted over said distribution system signalling interface into a frame format used for handover messages transmitted over the distribution system signalling interface.

In an embodiment, the apparatus further comprises means for triggering said negotiation about the transmission medium reservation upon detection that the second access point utilizes a transmit power higher than a transmit power of the first access point.

In an embodiment, the apparatus further comprises means for causing the first access point to request, through the distribution system signalling interface, the second network to be switched to a non-overlapping frequency band; and means for receiving an acknowledgment for the request through the distribution system signalling interface.

In an embodiment, the apparatus further comprises means for receiving, through the distribution system signalling interface, a request to switch the first network to a non-overlapping frequency band; means for determining whether or not a non-overlapping frequency band is available for the first network; means for causing the first network to switch to the available non-overlapping frequency band upon detection of an available non-overlapping frequency band; means for causing the first network to maintain the overlapping frequency band upon detection of no available non-overlapping frequency band; and means for causing the first access point to transmit an acknowledgment for the request through the distribution system signalling interface.

In an embodiment, the apparatus further comprises means for causing the first access point to request, through the distribution system signalling interface, that the second access point schedules medium reservation for the first network in the second network on the overlapping frequency band; means for receiving, through the distribution system signalling interface, a response message indicating transmission opportunity scheduled to the first network; and means for causing radio transmission in the first network according to the scheduled transmission opportunity.

In an embodiment, the apparatus further comprises means for receiving, through the distribution system signalling interface, a request to schedule medium reservation in the first network for the second network on the overlapping frequency band; means for scheduling a transmission opportunity to the second network; means for causing the first access point to transmit to the second access point through the distribution system signalling interface, a response message indicating the transmission opportunity scheduled to the second network; and means for preventing transmission in the first network for the duration of the transmission opportunity of the second network.

According to another aspect of the present invention, there is provided an apparatus comprising means for detecting, in a network apparatus, presence of a first network and a second network on overlapping frequency bands; means for detecting that the first network and the second network utilize different radio transmission bandwidths; and means for causing at least a first access point of the first network to initiate a procedure to align the radio transmission bandwidths between the first network and the second network in response to the detection of the different radio transmission bandwidths between the first network and the second network.

In an embodiment, the apparatus further comprises means for determining the bandwidth of the second network; and means for configuring the first network to utilize the same bandwidth as the second network.

In an embodiment, the apparatus further comprises means for determining the bandwidth of the second network; and means for causing the first access point to transmit to a second access point of the second network a request to change the bandwidth of the second network to match with a bandwidth of the first network.

In an embodiment, the apparatus further comprises means for receiving from a second access point of the second network a request to change a bandwidth of the first network to match with a bandwidth of the second network; means for determining whether or not the bandwidth of the second network is applicable to the first network; means for configuring the first network to utilize the same bandwidth as the second network upon determining that the bandwidth of the second network is applicable to the first network; and means for transmitting a confirmation message to the second access point as a response to the request.

In an embodiment, the apparatus further comprises means for instructing at least one of the first access point and the second access point to change the bandwidth so as to align the bandwidths of the first network and the second network.

In an embodiment, the apparatus further comprises means for configuring the first access point to operate according to IEEE 802.11 wireless local area network specifications.

In an embodiment, the apparatus further comprises means for configuring the first network to operate on a frequency band operable by a primary radio system and to avoid utilization of frequency bands currently used by the primary radio system in a geographical area of the first network.

Embodiments of the invention are defined in the dependent claims.

LIST OF DRAWINGS

Embodiments of the present invention are described below, by way of example only, with reference to the accompanying drawings, in which.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
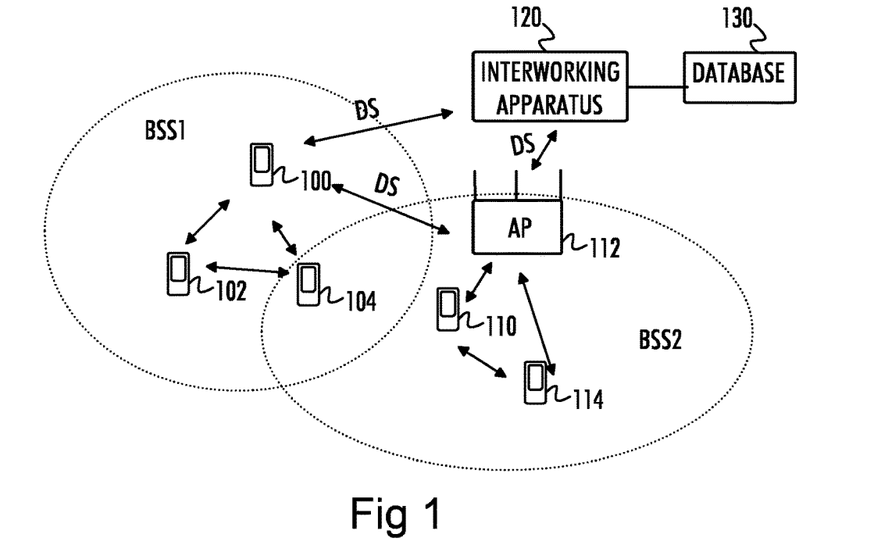
FIG. 1 illustrates general communication scenario to which embodiments of the invention may be applied.

A general architecture of a wireless communication system to which embodiments of the invention may be applied is illustrated in FIG. 1. FIG. 1 illustrates two groups of wireless communication devices forming two basic service sets BSS1 and BSS2, e.g. groups of wireless communication devices comprising an access point (AP) 100, 112 and terminal stations (STA) 102, 104, 110, 114 communicating with the access points 100, 112 of their respective groups. A basic service set (BSS) is a basic building block of an IEEE 802.11 wireless local area network (WLAN). The most common BSS type is an infrastructure BSS that includes a single AP together with all associated STAs. The AP may be a fixed AP as AP 112, or it may be a mobile AP as AP 100. The APs 100, 112 may also provide access to other networks, e.g. the Internet. In FIG. 1, the BSS1 and BSS2 form logically separate WLANs that have overlapping coverage areas, as illustrated by dashed lining. For example, a STA 104 resides in a coverage area of both BSSs and, therefore, may cause interference between the BSSs and/or suffer from it.

The two BSSs may be located in a coverage area of a primary system and configured to operate on frequency channels of the primary system that are currently free in the geographical area of the BSSs. The primary system may be a television (TV) broadcast system comprising a broadcast tower broadcasting television channels on some channels of the common frequency band. The primary system may, however, be any other radio system having a priority over the BSSs to occupy the frequency channels. The BSSs may have secondary access to the frequency channels of the primary system, which means that they must operate under the rules specified by current operational parameters of the primary system so as not to interfere the operation of the primary system. For example, the Federal Communications Commission (FCC) in the United States has issued a report and order (R&O) which permits the use of TV white space (TV WS) spectrum. White space is the term used by the FCC for a TV spectrum which is not being occupied for primary usage e.g. by the TV or wireless microphone transmitters at a given time in a given geographical area. The BSSs forming the secondary system may be configured to utilize available frequency bands of such a spectrum having a frequency band on a very high frequency band (VHF, 30 to 300 MHz), ultra-high frequency band (UHF, 300 to 3000 MHz), and/or other frequency bands. With respect to the networks of the secondary system, the operation of the BSSs may be based on upcoming IEEE 802.11 of specification (specification work on-going) being developed for TVWS band operation, but the system may in some embodiments be based on another specification, e.g. another IEEE 802.11-based network (e.g. IEEE 802.11n, or 802.11ac), Universal Mobile Telecommunication System (UMTS) or any one of its evolution versions (e.g. long-term evolution, LTE, or LTE-Advanced), a system based on International Mobile Telecommunication (IMT) standard or any one of its evolution versions (e.g. IMT-Advanced), Worldwide Interoperability for Microwave Access (WiMAX), etc. However, the secondary system is not limited to these examples and it may be any other wireless network within the scope of the present claims. The primary system also need not be a TV broadcast or a wireless microphone transmitter system, and it may be any other system having a frequency band that may be shared with the secondary system. The frequencies may also be available without any assigned primary user, e.g. their utilization may be based on cognitive radio access schemes.

In some embodiments, the primary system has a priority over the frequency bands. The secondary system, e.g. each BSS, may then be configured to dynamically adapt to the spectrum utilization of the primary system and occupy a frequency band not used by the primary system in a given geographical area. In such embodiments, there may be rules for the secondary system to ensure minimization/lack of interference towards the primary system, and these rules may require access to information on free frequency bands in each geographical area and/or sensing and use of specified maximum transmit power levels. Such information on the free frequency bands may be stored in a database 130 to which the access points 100, 112 have access either directly or through an interworking apparatus 120 controlling operation of a plurality of networks (BSSs) in a given area. The database 130 may store the maximum transmit power limits that the BSSs may not exceed so as not to interfere with the users of the primary system.

An operator of the primary system or an authority like a regulator may update the database 130 as the channel allocation of the primary system changes, and the access points 100, 112 or the interworking apparatus 120 may periodically (or constantly or upon notification of a change in the contents of the database) monitor the database 130 for an updated channel allocation and take measures to adjust its own frequency allocation accordingly.

The deployment of the BSSs on the white space frequency bands may cover both outdoor and indoor areas. Such operation is supported due to relatively longer propagation range of the white space frequencies (VHF and UHF bands) as well as provision of high-power fixed transmitters and low-power portable devices from the FCC. It is possible that outdoor high-power networks (BSSs) are managed by service providers, such as for municipal Wi-Fi, hot-spots etc. In enterprise scenarios, information technology (IT) infrastructure might utilize networks of different coverage areas to support different requirements, such as low data rate services in its parking lots or campus areas, and high-data rate services for indoor. The use of TV white spaces may be complementary to existing Wi-Fi usage on conventional frequency bands, or a stand-alone network may be provided if it can meet the traffic requirements in its location. The possible overlapping between networks of different transmit power levels or coverage areas such as high-power fixed BSS and a low-power portable BSS may cause coexistence problems mentioned in the Background section. Resource management problem is very much dependent upon availability of white space channels in the area of operation and the deployment scenario.

Before a fixed network can initiate transmissions to setup a network on the white space bands, an access point 112 of the network should be first able to connect to the database 130 to obtain a list of available channels on which they may transmit from their current location. FCC has set out the requirements for the fixed networks on their geo-location capabilities to determine geographic coordinates of the fixed network, and methods to access the database. Before a STA 110, 114 of the network is allowed to transmit on the white space band or join the network, it must detect an over-the-air enabling signal from the access point 112 and, subsequently, it may perform a connection establishment procedure. The connection establishment procedure may include exchange of device identification and authentication with the access point 112, the available channel information being received from the access point 112 upon successful connection establishment procedure. A logical entity called as interworking apparatus 120 or a registered location secure server (RLSS) may be utilized to control the operational parameters of the BSSs. The interworking apparatus 120 may be an advertisement server available to an access point 100, 112 to support a RLQP (registered location query protocol) protocol that may be based on interworking capability defined by 802.11u for using Generic Advertising Services (GAS). The RLSS entity 120 may be present within the access point(s) 100, 112, or it may be an external apparatus belonging to network management of a service provider. The RLSS performs the role of an enabler in white space operation. RLSS may have two functional roles: it may serve as a proxy to external databases, e.g. the database 130, and as a network management service node that provides enablement services and other operational controls for the BSSs.

The connection establishment between the STA and the access point is facilitated through the RLSS. For example, the RLSS may query for white space channels available for the location of the BSS from the database as a part of the RLQP. Upon gaining the information on the free channels, the RLSS 120 may configure the access points 100, 112 to occupy the free channels.

Due to many new challenges in occupying the white spaces, such as dependency on the external geo-location database 130 for obtaining available channel information, probability of a limited number of frequency channels in many urban areas, and possibility of multiple overlapping coverage regions due to the longer propagation range and/or higher and different transmit power levels, any new network initiation or changes on operational parameters of at least one operating network requires better information sharing among adjacent networks. The RLSS entity may assist on information sharing for interference avoidance or mitigation in many network deployment scenarios. In many deployments under one operator's service domain, multiple access points 100, 112 may be served by the common RLSS 120 as shown in FIG. 1.

To allow interference management (IM) and coordination when setting up or managing networks or BSSs with the support of the common RLSS entity 120 or enabler entity, following information exchange and methods may be applied between an access point 100, 112 and the RLSS entity 120.

The access point 100, 112 may request information on other networks on the same area by using an IM request. Let us assume that the access point 100, 112 has obtained the list of available channels available for its use by using the above-mentioned channel availability query exchange involving the database 130. The RLSS may store such information (e.g., the channel available at a location, schedules of channel availability etc.), in addition with operational parameters (e.g., current channel, bandwidth, and power) of other APs in its service area. The IM request transmitted by the access point 100, 112 to the RLSS 120 may comprise device identification information of the RLSS entity 120 (so as to address the request to the RLSS 120), which may be a device identifier issued by the RLSS during initial connection establishment between the access point 100, 112 and the RLSS 120, but it may comprise detailed information (e.g., FCC Identifier and manufacture's serial number). The access point 100, 112 may also indicate a minimum proximity radius for which it prefers to receive the relevant information on the other networks. The RLSS may use this radius of coverage from the current location of the access point 100, 112 for deriving relevant IM information. The IM request may comprise a type identifier identifying the type of the request. At least two values are possible: Type 1 for requesting for available IM information for its area; and Type 2 for requesting to be actively managed by the RLSS (if supported) for all future resource allocations. The first option (Type 1) is for some deployment scenarios, where the network operation by each access point 100, 112 is allowed to function independently without any centralized control. The common RLSS 120 may assist the local decisions of the access point 100, 112 by sharing information available to the RLSS 120. The second option (Type 2) is for scenarios where the operation is tightly controlled by a single network administrator e.g., in an enterprise environment. When the request type is set to Type 2, the RLSS may dictate the operational parameters (e.g. channel allocation) for the access point 100, 112.

An IM Response transmitted by the RLSS may provide the access point with operational parameters of potentially-interfering other networks. The operational parameters of the other network(s) may contain information acquired by the RLSS 120 on any access point 100, 112 of potentially overlapping networks. The overlapping may be in terms of geographical location and/or frequency channels. The information on the overlapping network transmitted by the RLSS 120 to the requesting access point 100, 112 may comprise an identifier, a frequency channel(s), channel bandwidth, and transmit power levels of the overlapping network, a relative distance to the requesting device, an operating mode of the overlapping network (fixed, personal/portable, mobile etc.) operating environment of the overlapping network (outdoor, indoor). The IM response information may be filtered by the RLSS 120 based on the potential interference effect to the requesting access point 100, 112, e.g. the effect of the transmit power may be determined by evaluating Equation Transmit Power/distance n (n being a path-loss exponent in the assumed environment) against a threshold, for example.

When the IM Request Type is set to Type 2, the RLSS 120 may recommend or even command the requesting access point 100, 112 to apply to parameters defined in the IM response. The RLSS 120 may specify the information on which frequency channel, bandwidth and power level the access point should be operating on to optimize the coexistence with the other network(s).

Using the known information on geo-location, device classes, and other operational parameters of the networks in its service area, the RLSS 120 may determine internally candidate interfering networks in the area of a given reference device (access point) or network, and extract the useful IM information of those networks. At least two complimentary methods may be used to derive the information:

Based on the device class and location information of the requesting access point 100, 112, the RLSS 120 may first compute the region of estimated coverage area of the access point 100, 112 including its STAs 102, 104, 110, 114. Such estimations can be based on using standard propagation calculations for the assumed environment.

Using the geo-location and channel availability information of other access points operating in its service area, the RLSS 120 may select the networks potentially causing interference towards the network of the requesting access point 100, 112. A network may be excluded, for example, when there is no overlapping in list of available channels and/or when the relative distance between the requesting access point to other access points is far apart such that an influence propagation region of the other access points cannot cause interference with the known operational parameters of the other networks.

In addition to sending the IM Response based on request received from the requesting access point 100, 112, the RLSS 120 may send un-solicited notification messages to indicate any changes in operational parameters (e.g., frequency channel, bandwidth, power, mobility etc.) of any one of the potentially interfering networks.

Before initiating a new network, the requesting access point 100, 112 first obtains the list of available channels for its use, as well as, the IM Information from the RLSS 120. The requesting access point may either generate and send an exclusive IM Request message before its network initiation, or may indicate such request by piggybacking the parameters in connection with any other signalling exchange with the RLSS 120, such as during the channel availability query message. The access point 100, 112 then performs its channel, bandwidth and transmit power selection for its network based on the known constraints provided by the RLSS 120. Due to the availability of additional IM Information received from RLSS 120, the access point 100, 112 is able to avoid or mitigate interference and maximize resource utilization by using various options, such as:

Identify frequencies that must be avoided, e.g., presence of any high-power devices in some frequencies at a relatively close proximity means none of existing collision avoidance techniques can effectively work Based on the knowledge of the other networks, the bandwidth and frequency should be selected to avoid partial overlapping. For example, if the access point 100, 112 decides to use at least partly the same frequency resources as another network, the access point 100, 112 may choose the bandwidth to be the same as the bandwidth of the overlapping network so as to enable compatibility and coexistence of the two networks (discussed in greater detail below with reference to FIGS. 8 and 9).

During operation, the IM information allows the device to select the optimal channel parameters for performing any required changes to the occupied frequency channels when the channel availability defined by the occupation of the primary system (obtained from the database 130) has changed, or in the event of increased interference detection.

In addition to the initial network setup based on the IM response received from the RLSS 120, the access point 100, 112 of the network may also perform changes to its operational parameters when it receives any un-solicited notification messages that indicate any changes in operational parameters (e.g., frequency channel, bandwidth, power, mobility etc.) of (an)other potentially interfering neighbour network(s).

Another interference scenario in overlapping BSSs created by access points 100, 112 having a co-located RLSS 120 may occur when the overlapping BSSs have significantly different power levels, e.g. a one access point 112 is a fixed device covering in a large outdoor area, whereas, another access point is a personal/portable device typically deployed indoor. In order to coordinate coexistence among such networks, coexistence messages may be exchanged by using any transmission medium. Current FCC rules require that a fixed device broadcasts an identifying signal that has its identification and location information. When a STA in a low-power BSS is able to receive such a signal, the low-power BSS may determine that the interference is caused by a high-power BSS. The effect of interference from a high-power network is different from a network having a similar transmit power level. When the STA in the low-power BSS is able to detect the signal from the high-power BSS, it should report it to its access point by issuing a notification message to indicate presence of the interfering high-power BSS. Upon receiving such message, the access point may set the status of its BSS to a mode used when a high-power overlapping BSS has been detected. For example, a conventional Request-to-Send (RTS) and Clear-to-Send (CTS) handshake to carry out medium reservation so as to avoid interference may not work, because an RTS/CTS message transmitted from a low-power STA or access point may not reach the interfering high-power STAs.

A Wireless Distribution System (WDS) is a system enabling wireless interconnection between access points 100, 112 and/or RLSS entities 120 (see FIG. 1) in an IEEE 802.11 network. It enables a wireless network to communicate with other elements of other networks, e.g. other access points, without the traditional requirement for a wired backbone to link them. A signalling interface between the access points 100, 112, between RLSS entities 120, and/or between an access point 100, 112 and an RLSS entity 120 is referred to as a distribution system (DS) signalling interface. The DS signalling interface may be a wireless interface, and it may be logically separate from an interface used for communicating within a BSS. For example, different communication protocols and different frame formats may be used for the DS interface and the BSS interface. The DS interface may also be called a backbone interface, as it provides a communication link to elements that are external with respect to the BSS. Message flows between two entities through the backbone communication link, such as using over-the-DS message transport introduced by 802.11r can be very useful. It has been proposed to use the DS interface for a fast BSS transition protocol in an 802.11-based wireless network. The fast BSS transition may be understood as a handing a terminal device (STA) from one BSS to another BSS using handover messages exchanged prior to transition. Access points supporting the fast transition may include a remote request broker (RRB) functionality to handle the fast transition.

Figure 2:
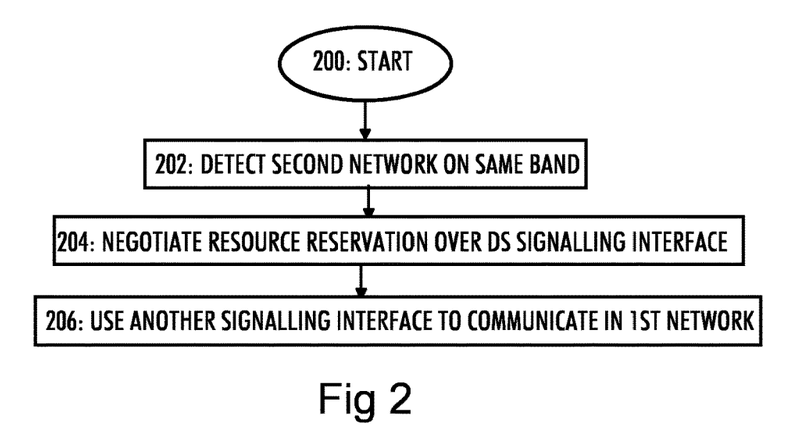
FIG. 2 illustrates a flow diagram of a process for interference management between two networks according to an embodiment of the invention.

Let us now consider above-mentioned interference scenario where two BSSs having overlapping coverage areas (see FIG. 1) operate on overlapping frequency channels. In order to protect transmissions within a first BSS, an access point 100 of the first BSS utilizes the DS interface to negotiate about the coexistence of the two BSSs. Referring to FIG. 2, let us describe a method for interference management in a WLAN network. The method may be carried out by an apparatus comprised in the access point 100, e.g. the method may be provided in a form of a computer process configuring a processor to execute the method. The method starts in block 200. Block 200 may comprise configuring the access point 100 to establish the BSS as described above, wherein the establishment may comprise exchanging IM messages with the RLSS entity 120 so as to determine and configure the operational parameters of the first BSS.

In block 202 the first access point detects the presence of the second BSS on the overlapping frequency band. The detection may be based on the IM information received from the RLSS, or the detection may be based on active or passive scanning of a radio interface and detection of signals transmitted by the second BSS. The detection based on said scanning may be made by the first access point 100 or a terminal device (STA) 102, 104 of the first BSS.

Let us now assume that the access point 100 determines to reserve a transmission medium in the first BSS for a transmission opportunity. The determination may be based on reception of an RTS message from a terminal device 102, 104, or the access point 100 may determine to carry out a transmission in the first BSS. As a consequence, the access point 100 is arranged to utilize in block 204 the DS signalling interface to negotiate about transmission medium reservation for communication in the first network so as to avoid transmission collisions between the first network and the second network. The negotiation may comprise communication with the access point 112 and/or the RLSS entity 120, as will be described in greater detail below. Upon negotiation about the medium reservation, the access point 100 causes the transmission in the first BSS in block 206. The transmission may be triggered by utilizing within the first network a signalling interface different from the distribution system signalling interface.

In an embodiment, the negotiation about the transmission medium reservation (block 204) may be triggered upon detection that the second BSS utilizes a transmit power higher than a transmit power of the first BSS.

Figure 3:
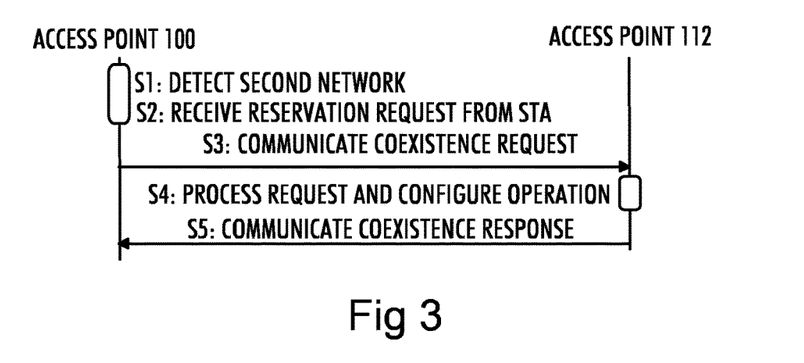
FIGS. 3 to 6 are signalling diagrams related to some embodiments for resolving interference between two networks.

Let us now consider different embodiments of the method of FIG. 2 with respect to signalling diagrams of FIGS. 3 to 6. FIG. 3 illustrates an embodiment where the access point 100 of the first BSS negotiates with the access point 112 of the second BSS about the coexistence. At least one of the two access points 100, 112 may comprise the RLSS entity, or neither of the access points 100, 112 comprises the RLSS entity. In S1, the access point 100 detects the second BSS, and receives a medium reservation request (e.g. the RTS) from a terminal device 102, 104 in S2. In order to avoid collisions, the access point 100 transmits in S3 a coexistence request to the other access point 112. The coexistence request may be a fast transition action frame with a Remote Coexistence Request transmitted over the DS signalling interface. Upon reception of the coexistence request in S3, the access point 112 extracts the fast transition action frame, processes the coexistence request and configures the operation of the second BSS in S4. S4 may comprise changing the operational parameters of the second BSS or carrying out a medium reservation in the second BSS, as will be described below. Upon resolving the request in S4, the access point 112 transmits a coexistence response message back to the requesting access point 100. The response may also be provided in the fast transition action frame format. Upon receiving the response in S5, the requesting access point 100 may control the medium reservation and transmission in the first BSS, e.g. by transmitting a CTS message in response to the RTS message received from the terminal device requesting the transmission opportunity. As a consequence, the interference management has been carried out in both overlapping BSSs, and the transmission may be carried out without a collision.

Figure 4:
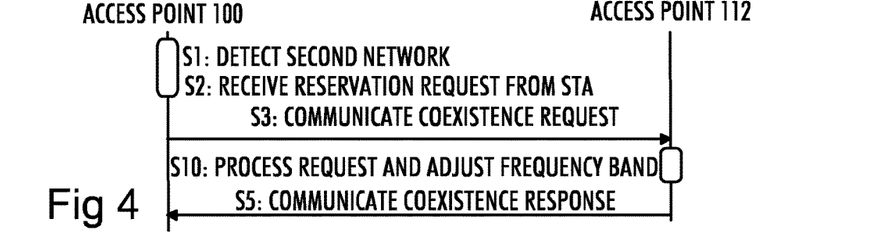

Referring to FIG. 4, let us consider another embodiment for carrying out the interference management between the overlapping BSSs. Steps S1 to S3 are similar to the corresponding steps in FIG. 3. In an embodiment, the coexistence request in S3 comprises a request for the second BSS to switch to another, non-overlapping frequency band. Upon reception of the coexistence request in S3, the access point 112 processes the request and determines whether or not a non-overlapping frequency band is available for the second BSS in S10. This may comprise determining TV white space frequencies currently available to the second BSS. Upon detection of an available non-overlapping frequency band, the access point 112 reconfigures the second BSS to switch to the available non-overlapping frequency band. However, upon detection of no available non-overlapping frequency band, access point 112 may maintain the overlapping frequency band. In S5, the access point 112 transmits the coexistence response message back to the requesting access point 100. The response may indicate whether or not the second BSS switched to another frequency band. Upon reception of the response, the access point 100 extracts the response and determines whether or not the possible interference issue has been solved, e.g. whether or not the second BSS switched to another frequency band. If the interference issue was solved, e.g. if the second BSS switched to another frequency band, the access point 100 may proceed with the transmission opportunity, as described above. However, if the interference issue was not solved, e.g. if the second BSS did not switch to another frequency band, the access point 100 may carry out other interference management procedures before enabling the transmission, or it may enable the transmission with the risk of collision.

Figure 5:
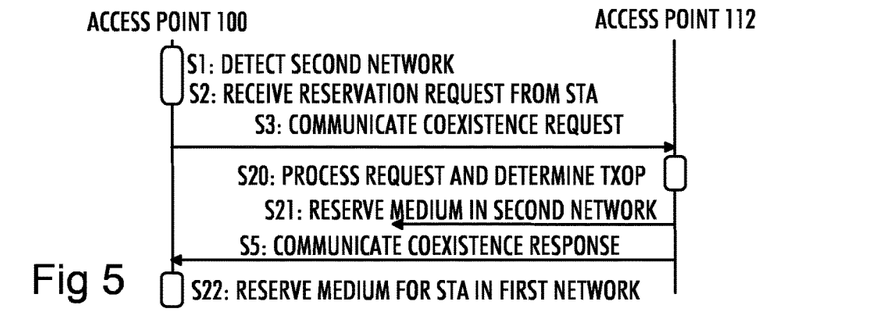

FIG. 5 illustrates an embodiment where the access point 100 requests the other access point 112 to schedule medium reservation in the second BSS to protect a transmission in the first BSS. Referring to FIG. 5, steps S1 to S3 are similar to the corresponding steps in FIG. 3. In an embodiment, the coexistence request in S3 comprises a request for the access point 112 to schedule the medium reservation for the first BSS. The reservation request received from the terminal device in S2 may comprise an indication of an estimated duration required by the terminal device for the transmission, or the duration of the transmission opportunity may be derived by other means. The access point 100 may provide the required duration for the transmission opportunity in the coexistence request in S3. In S20, the access point 112 processes the request and monitors for a transmission opportunity (TXOP) in the second BSS. Upon gaining the TXOP, the access point 112 carries out a channel reservation in the second BSS in S21, e.g. by transmitting a CTS message addressed to the access point 112 itself (CTS-to-self message) within the second BSS so as to prevent other transmissions in the second BSS. The reservation may include setting a network allocation vector (NAV) in the second BSS. In connection with the channel reservation in S21, the access point 112 transmits the coexistence response message in S5. The response may comprise a scheduling grant notification indicating that the second BSS is currently prevented from transmitting for the requested duration. Upon reception of the response in S5, the requesting access point 100 reserves the medium in the first BSS in S22, e.g. by transmitting a CTS message in the first BSS, thereby allowing the terminal device to carry out the transmission.

The scheduling of the medium reservation in the second BSS may be made dynamically on a need basis, e.g. separately for each terminal device in the first BSS in response to the transmission request (RTS) from each terminal device. In some embodiments, the medium in the second BSS may be reserved collectively for a plurality of terminal device, in which case a longer duration may be reserved. In such embodiments, the coexistence request may be a bundled request requesting the medium reservation in the second BSS for a plurality of terminal devices of the first BSS.

It should be noted that the duration of the reservation in the second BSS in S21 may take into account possible delays in communication of the response in S5. As a consequence, the duration of the reservation carried out in S21 may be longer than the requested duration. It should be also noted that an embodiment provides a combination of embodiments of FIGS. 4 and 5. For example, the requesting access point 100 may request both channel switch and the scheduling. The other access point 112 may then resolve the requests according to a determined rule, e.g. it may prefer channel switch over scheduling or vice versa. Further, it should be noted that the processes of FIGS. 3 to 5 may be carried out to the opposite direction, e.g. that the access point 112 is the requesting access point and the access point 100 processes the requests and carries out the interference management by reconfiguring the first BSS and/or by scheduling transmissions for the second BSS. In an embodiment, the access points 100, 112 support both functionalities (requesting coexistence and resolving coexistence issues).

Figure 6:
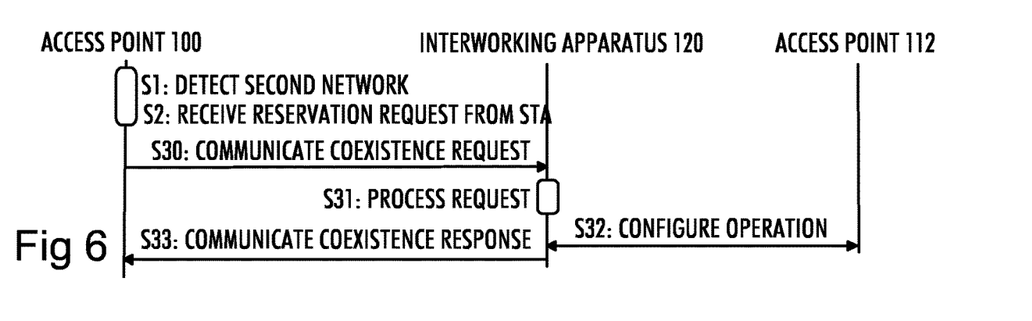

FIG. 6 relates to an embodiment where an RLSS entity (the interworking apparatus 120) controls the operation of the BSSs, and the requests are directed to the RLSS entity. S1 and S2 are similar to the corresponding steps in FIG. 3. In S30, the access point 100 transmits the coexistence request to the RLSS entity 120. The request may be any one of the above-described coexistence requests, e.g. a request for the channel switch or scheduling. Upon reception of the request in S30, the RLSS entity 120 processes the request in S31 and determines how to solve the request. S31 may comprise checking the available white space frequencies whether or not it is possible to arrange the two BSSs to non-overlapping frequencies. It may also (or alternatively) comprise determining to resolve the request through scheduling. In S32, the RLSS entity communicates with the access point 112 of the second BSS and configures the operation of the access point 112 and/or the second BSS. S32 may comprise configuring the channel switch and/or requesting the access point 112 to reserve the medium in the second BSS. Upon resolving the request, e.g. upon receiving a confirmation about the channel switch or medium reservation from the access point 112 in S32, the RLSS entity transmits the coexistence response to the requesting access point 100 in S33. The response may specify how the request was solved, e.g. through channel switch or through scheduling. Upon receiving the response in S33, the requesting access point may configure the transmission in the first BSS.

In order to avoid frequent transmissions of coexistence request messages between overlapping networks, the requesting access point 100 (or 112) may instead request the other (resolving) access point to switch to a scheduled transmission mode. During the scheduled transmission mode, the resolving access point allocates a medium grant time in its BSS periodically such that the transmissions in the BSS is prevented for the medium grant time periodically. As a consequence, resources are periodically reserved for the BSS of the requesting access point. The coexistence response message may in this case be transmitted as described above except that the scheduling information may be comprised in the response so as to inform the requesting access point about the scheduled time periodicity and the duration of each medium grant time.

Let us now consider other embodiments. In order to provide flexibility to utilization of available frequency resources, BSSs operating on the white space frequencies should be able to operate dynamically on multiple bandwidths, starting from a lower channel bandwidth consisting of one TV white space channel and increasing to a bandwidth comprising multiple TV white space channels when they become available. To facilitate such operation, let us first assume that channel bandwidths of 5, 10, 20 or 40 MHz are supported, e.g. as the white space bands. However, due to possibility of multiple channel bandwidths for operation, coexistence among overlapping networks may become problematic. Let us consider two cases. In the first case, a first network (e.g. BSS1) has been operating within a single TV channel by using e.g. 5 MHz transmissions. If a new network (e.g. BSS2) appears around its coverage region and occupies two TV channels, for example, wherein at least one of the channels overlaps with the channel of the first network BSS1, the first network may suffer from interference that cannot be detected through conventional clear channel assessment (CCA) procedures. As an example, the first network with a 5 MHz system uses a symbol length of 16 μs, whereas, the other network as a 10 MHz system has a symbol length of 8 μs. Hence, preamble detection for the CCA does not work due to the symbol length mismatch. Another issue is that no virtual carrier sensing may be realized among nodes of the overlapping networks. The nodes cannot decode the medium access control (MAC) frames of the other network to set the NAV for any on-going transmissions. Furthermore, due to differences in slot time durations in overlapping networks because of different symbol lengths, channel contention becomes unfair. It should be appreciated that similar problems may exist in other networks utilizing other frequency channels than TV white space frequencies. Therefore, while the following description uses the TV white spaces as an example for the described embodiments, other embodiments may carry out similar functionalities described herein for other frequency channels, e.g. ISM (Industrial, Scientific, and Medical) frequency band, or licensed frequency bands.

An objective for any access point trying to initiate a new network may be to ensure coexistence with other existing networks, for example in TV white space bands, in order to avoid interference. In connection with establishing the new BSS, once the access point receives the list of available channels for its location, it may perform initial active or passive scanning over its intended range of available frequencies to detect any overlapping other BSSs in the area. The scanning for beacons transmitted by the other BSSs may first start by utilizing a channel bandwidth the access point intends to use for its initial BSS setup. However, other embodiments start the scanning from lowest channel bandwidths (e.g., 5 MHz) which may reduce the scanning time as the range of reception with lower bandwidth will be the highest.

Figure 7:
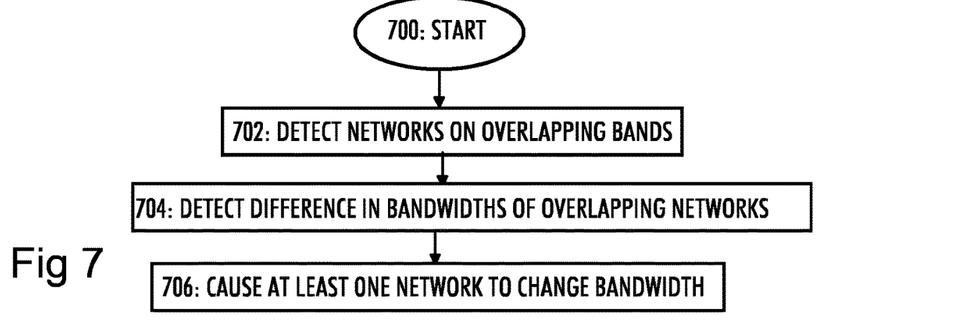
FIG. 7 is a flow diagram of a process for aligning bandwidths of two overlapping networks according to an embodiment of the invention.

An objective may be to align the symbol durations of the overlapping networks in order to overcome the above-mentioned problems. In order to achieve this, bandwidths of the overlapping networks may be aligned. This may be carried out by changing the bandwidth of at least one of the overlapping networks upon detection of the bandwidth mismatch. FIG. 7 illustrates an embodiment of a method for aligning the bandwidths. The method may be carried out in an access point 100, 112 or in an interworking apparatus 120. Referring to FIG. 7, the process starts in block 700. Block 700 may comprise initialization of at least one BSS, and the initialization may comprise at least some of the above-mentioned procedures. In block 702, a network apparatus, e.g. the access point 100, 112 or the interworking apparatus 120, detects the presence of a first BSS and a second BSS on overlapping frequency bands. In block 702, the network apparatus detects that the first BSS and the second BSS utilize different radio transmission bandwidths. In response to the detection of the different radio transmission bandwidths between the first BSS and the second BSS network, the network apparatus causes at least a first access point 100, 112 of the first BSS to initiate a procedure to align the radio transmission bandwidths between the first BSS and the second BSS. In an embodiment, the network apparatus causes additionally a second access point 100, 112 of the second BSS to initiate the procedure to align the radio transmission bandwidths. With the bandwidths being aligned, the two BSSs may extract frames of the other BSS, thereby enabling the BSSs to share NAV settings and other features used for interference management.

In an embodiment, an access point 100, 112 detecting the bandwidth mismatch in block 704 autonomously adapts the bandwidth of its BSS to the bandwidth of the overlapping BSS, e.g. by changing the bandwidth to become the same as the bandwidth of the overlapping BSS. For example, the access point may select a white space channel having the same bandwidth as the bandwidth of the overlapping BSS. The overlapping of the frequency channels may be partial or full in any embodiment described in this document.

Figure 8:
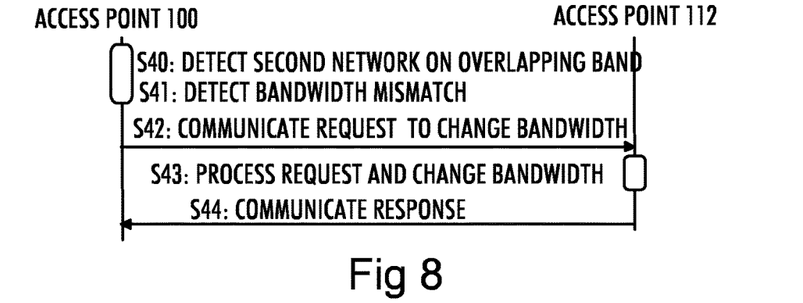
FIGS. 8 and 9 are signalling diagrams related to some embodiments for resolving the bandwidth mismatch between the two networks.

In another embodiment, the access point 100 requests the access point 112 of the other BSS to change the bandwidth. FIG. 8 illustrates a signalling diagram of such a process. Referring to FIG. 8, the access point 100 of the first BSS detects the second BSS on the overlapping frequency band in S40 (block 702). In S41, the access point 100 detects the bandwidth mismatch between the first BSS and the second BSS (block 704). In S42, the access point transmits a request to change the bandwidth of the second BSS to the access point 112. This may be understood as the initiation of the procedure for bandwidth alignment (block 706). The request may be transmitted over the backbone link, e.g. the DS signalling interface. The request may specify the bandwidth the second BSS is requested to adopt. At this stage, the access point 112 detects the bandwidth mismatch (block 704), and the access point initiates the procedure for bandwidth alignment (block 706) in response to the reception of the request. In S43, the access point 112 processes the request and determines whether or not the bandwidth adaptation is possible. S43 may comprise detection of available white space bands so as to determine whether or not the bandwidth alignment is possible. Upon detection that the requested bandwidth may be realized, the access point 112 reconfigures the second BSS to change the bandwidth to the requested bandwidth in S43. In S44, the access point 112 transmits a response to the request, the response acknowledging the request and indicating whether or not the request was fulfilled. If the request was fulfilled, the requesting access point 100 may consider the interference management being completed. If the request was fulfilled, the requesting access point 100 may take other measures for the interference management, e.g. change the first BSS to a non-overlapping frequency band.

Figure 9:
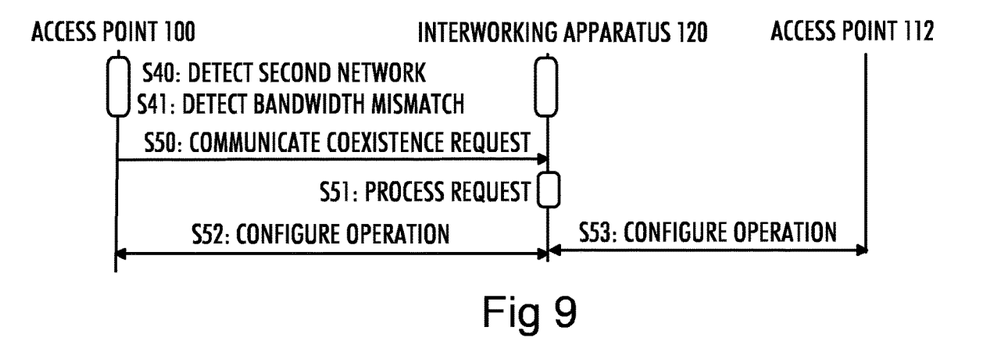

In yet another embodiment, the request for bandwidth adaptation is mediated by the interworking apparatus 120, e.g. the RLSS entity. FIG. 9 illustrates a signalling diagram of such an embodiment. In blocks S40 and S41, the network and the bandwidth mismatch are detected by the access point 100, and the access point transmits in S50 the request for the bandwidth adaptation to the interworking apparatus 120. This request may be a general request to solve the bandwidth mismatch issue, but it may also specify a bandwidth preference of the access point 100. The request may be in the format of the above-mentioned coexistence request. Upon reception of the request, the interworking apparatus detects the bandwidth mismatch, and it processes the request in S51. S51 may comprise searching for an available common bandwidth that both the first BSS and the second BSS may adopt. Upon discovering a common bandwidth that is available for both BSSs, the interworking apparatus reconfigures the bandwidth of the first BSS (S52) and/or the bandwidth of the second BSS (S53). One of S52 and S53 may naturally be omitted, if one of the BSSs already operates with the correct bandwidth.

In another embodiment of FIG. 9, the interworking apparatus 120 autonomously detects the presence of the overlapping BSSs, e.g. through the above-described BSS initiation procedure where the interworking apparatus provides the access point(s) with relevant interference management information. The interworking apparatus 120 detects also the bandwidth mismatch autonomously, e.g. from current operational parameters reported by each BSS. In response to the detection of the bandwidth mismatch, the interworking apparatus 120 resolves the bandwidth mismatch and executes S52 and/or S53.

Nodes of the BSS may also constantly monitor for the overlapping BSSs during the operation of the BSS. For example, in connection with adding a client STA to the BSS, the client STA may be able to detect a signal from an overlapping BSS that was not detected by the access point at the time of the BSS setup. For that purpose, the access point 100, 112 may request its client STAs to perform, after successful association, scanning on a given set of channels in order to scan for overlapping BSSs. The range of channels used in the scanning should cover possible overlap of all bandwidths around the channels currently in use. Parameters used in the scanning process may define an operating class and channel numbers, type of scan (active or passive), and minimum scanning durations for each channel.

In order to proactively prevent the bandwidth mismatch, the access point may, before any bandwidth switching within the BSS, carry out the following procedure. Before any attempt on increasing the bandwidth or switching to new frequency channel (occupying more than one TV white space channels, for example), the access point may initiate the scanning for the overlapping BSSs on the intended new frequency band. The access point may carry out the scanning by itself and/or it may request the terminal devices of the BSS to carry out the scanning. The channel switch to the larger bandwidth may be an extension of currently applied band, or it may be a switch to a totally new bandwidth. Upon detection of overlapping BSSs on the intended new frequency band, the access point (or the interworking apparatus) may attempt to resolve the possible bandwidth mismatch, as described above. If the mismatch cannot be resolved, the expansion of the bandwidth to such channel(s) may be prevented so as to prevent interference. If the mismatch is resolved, the bandwidth expansion may be realized.

While operating in channel width higher than one TV channel (or generally a minimum bandwidth of the system), or even when operating on the minimum bandwidth of the system, the nodes (the access point and the terminal devices) of the BSS may monitor for any increase in the interference level (from received beacons, for example). The nodes may also be configured to carry out the monitoring on bandwidth(s) smaller than the currently applied bandwidth of the BSS. For example, if the BSS applies a 10 MHz bandwidth, the nodes may monitor both 5 MHz channels included in the 10 MHz band separately so as to detect any 5 MHz system. Any interference detection should be reported for coexistence support to the access point (unsolicited reporting from a STA), which may be used by the access point to set the operational mode of the BSS to the mode used in connection with the presence of the overlapping BSS. This may trigger the above-mentioned procedures for using the DS interface for interference management. The interference may be received by only some of the STAs when only a partial geographical overlapping of the BSSs is present.

Figure 10:
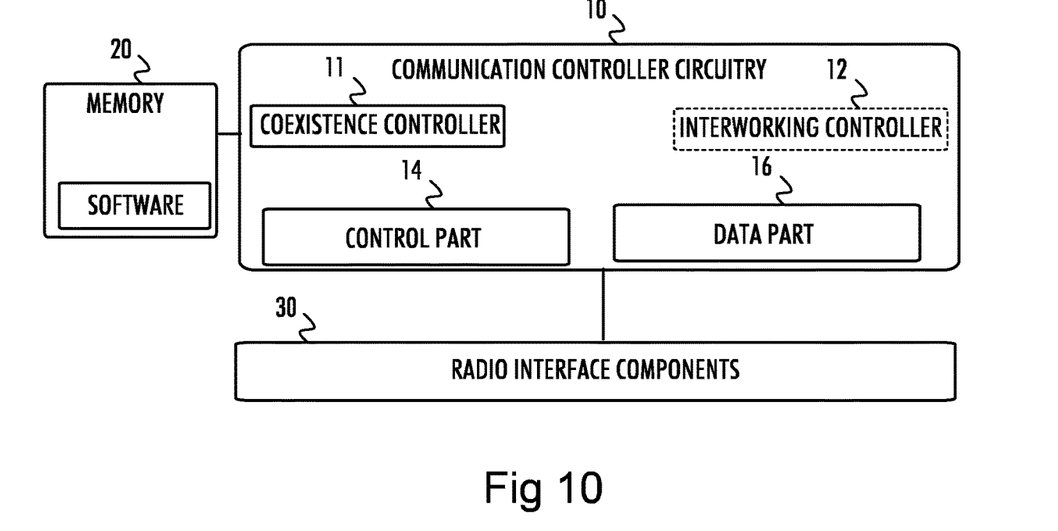
FIG. 10 illustrates a block diagram of an apparatus according to an embodiment of the invention.

FIG. 10 illustrates an embodiment of an apparatus comprising means for carrying out the above-mentioned functionalities of the network apparatus, e.g. the access point or the interworking apparatus. The apparatus may be a base station or access point apparatus dedicated for creating and managing a BSS. In other embodiments, the apparatus is a user device configured with the capability of operating as the access point, e.g. a computer (PC), a laptop, a tabloid computer, a cellular phone, a communicator, a smart phone, a palm computer, or any other communication apparatus. In another embodiment, the apparatus is applicable to any one of the above-mentioned devices, e.g. the apparatus may comprise a circuitry, e.g. a chip, a processor, a micro controller, or a combination of such circuitries in the device.

The apparatus may comprise a communication controller circuitry 10 configured to control the communications in the apparatus. The communication controller circuitry 10 may comprise a control part 14 handling control plane signalling with other devices within the same BSS and with devices external to the BSS. For example, the control part 14 may control establishment, operation, and termination of the BSS and carry out configuration and reconfiguration of the operational parameters utilized within the BSS. The control part 14 may also provide a connection to network elements external to the BSS, e.g. through the DS signalling interface.

The communication controller circuitry 10 may further comprise a data part 16 that handles transmission and reception of payload data within the BSS and to/from external networks, e.g. other BSSs and the Internet. The data part 16 may forward data received from an external network to the BSS and data received from the BSS within the BSS and/or to the external network(s).

The apparatus may further comprise a coexistence controller circuitry 11 implementing the above-described functionalities for discovering the potential interference scenarios (e.g. overlapping BSSs and bandwidth mismatch) and carrying out procedures for resolving the interference issues, as described above. Depending on whether the apparatus is the access point or the RLSS entity, the coexistence controller 11 may have different configurations. For example, when the apparatus is the access point, the coexistence controller 11 may request the RLSS entity through the DS interface to resolve any interference issues and, upon reception of reconfiguration instructions, implement the reconfigurations in the access point and/or in the BSS. When the apparatus is the RLSS entity, the coexistence controller 11 may resolve the interference issues and instruct the access point(s) to execute reconfiguration of operational parameters.

In some embodiments where the network apparatus is the access point, the access point may comprise an interworking controller circuitry 12 carrying out the functionalities of the interworking apparatus 120. In such embodiments, the coexistence controller may resolve at least some of the interference issues internally with the interworking controller circuitry 12. As a consequence, the DS signalling interface may be replaced by the internal signalling. However, the connection between the interworking controller circuitry and other access points may still be carried out through the DS signalling interface (or another signalling interface).

The circuitries 11 to 16 of the communication controller circuitry 10 may be carried out by the one or more physical circuitries or processors. In practice, the different circuitries may be realized by different computer program modules. Depending on the specifications and the design of the apparatus, the apparatus may comprise some of the circuitries 11 to 16 or all of them.

The apparatus may further comprise one or more memories 20 that stores computer programs (software) configuring the apparatus to perform the above-described functionalities of the network apparatus. The memory 20 may also store communication parameters and other information needed for the wireless communications and/or to carry out the interference management. For example, the memory 20 may store a list of allowed frequencies on the white space bands and/or a list of preferred frequencies or frequency band combinations available for use in the communication within the BSS. The memory 20 may also store rules for interference management upon detection of potential interference issues. The apparatus may further comprise radio interface components 30 providing the apparatus with radio communication capabilities within the BSS, with other BSSs, and/or with the RLSS entities. The radio interface components 30 may comprise standard well-known components such as amplifier, filter, frequency-converter, (de)modulator, and encoder/decoder circuitries and one or more antennas. The apparatus may further comprise a user interface enabling interaction with the user of the communication device. The user interface may comprise a display, a keypad or a keyboard, a loudspeaker, etc.

In an embodiment, the apparatus carrying out the embodiments of the invention for interference management comprises at least one processor and at least one memory including a computer program code, wherein the at least one memory and the computer program code are configured, with the at least one processor, to cause the apparatus to carry out the steps of the terminal device in any one of the processes of FIGS. 2 to 9. Accordingly, the at least one processor, the memory, and the computer program code form processing means for carrying out embodiments of the present invention in the network apparatus.

As used in this application, the term 'circuitry' refers to all of the following: (a) hardware-only circuit implementations, such as implementations in only analogue and/or digital circuitry, and (b) to combinations of circuits and software (and/or firmware), such as (as applicable): (i) a combination of processor(s) or (ii) portions of processor(s)/software including digital signal processor(s), software, and memory (memories) that work together to cause an apparatus to perform various functions, and (c) to circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular element, a baseband integrated circuit or applications processor integrated circuit for a mobile phone or a similar integrated circuit in server, a cellular network device, or other network device.

The processes or methods described in FIGS. 2 to 9 may also be carried out in the form of a computer process defined by a computer program. The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to cellular or mobile telecommunication systems defined above but also to other suitable telecommunication systems. The protocols used, the specifications of cellular telecommunication systems, their network elements and subscriber terminals, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method, comprising:
   detecting, in a network apparatus, presence of a first network and a second network on overlapping frequency bands;
   determining a first operating bandwidth of the first network, where the first operating bandwidth comprises a first upper frequency and a different first lower frequency;
   determining a second operating bandwidth of the second network, where the second operating bandwidth comprises a second upper frequency and a different second lower frequency;
   detecting that the first operating bandwidth and the second operating bandwidth are at least partially different, where the detecting comprises determining that at least one of the first upper frequency is different from the second upper frequency or the first lower frequency is different from the second lower frequency;
   in response to detecting that the first operating bandwidth and the second operating bandwidth are at least partially different, causing at least a first access point of the first network to initiate a procedure to change at least one operating bandwidth of a set comprising the first operating bandwidth and the second operating bandwidth so that the operating bandwidths of the first network and the second network are the same after the change.

2. The method of claim 1, wherein the procedure to change at least one operating bandwidth of the set comprises:
   causing the first access point to transmit to a second access point of the second network a request to change the second operating bandwidth of the second network to match with the first operating bandwidth of the first network.

3. The method of claim 1, wherein the network apparatus is an interworking network apparatus configuring operation of the first network and the second network, and wherein the procedure to change at least one operating bandwidth of the set comprises in the interworking network apparatus:
   instructing the first access point to change its first operating bandwidth so that the operating bandwidths of the first network and the second network are the same after the change.

4. The method of claim 1, further comprising: configuring the first access point to operate according to IEEE 802.11 wireless local area network specifications.

5. The method of claim 1, further comprising configuring the first network to operate on a frequency band operable by a primary radio system and the procedure to change at least one operating bandwidth of the set operates to avoid utilization of frequency bands currently used by the primary radio system in a geographical area of the first network.

6. The method according to claim 1, wherein after the procedure to change the at least one operating bandwidth, frequency channels of the first network are overlapping with frequency channels of the second network.

7. The method of claim 1 where the first operating bandwidth comprises the entire frequency bandwidth over which the first network operates, and where the second operating bandwidth comprises the entire frequency bandwidth over which the second network operates.

8. The method of claim 7 where the procedure causes frequency end points of the first operating bandwidth and the second operating bandwidth to become aligned.

9. The method of claim 1 where the procedure causes frequency end points of the first operating bandwidth and the second operating bandwidth to become aligned.

10. An apparatus comprising:
    at least one processor; and
    at least one non-transitory memory including a computer program code,
    wherein the at least one memory and the computer program code are configured, with the at least one processor, to cause the apparatus to:
      detect presence of a first network and a second network on overlapping frequency bands;
      determine a first operating bandwidth of the first network, where the first operating bandwidth comprises a first upper frequency and a different first lower frequency;
      determine a second operating bandwidth of the second network, where the second operating bandwidth comprises a second upper frequency and a different second lower frequency;
      detect that the first operating bandwidth and the second operating bandwidth are at least partially different, where the detecting comprises determining that at least one of the first upper frequency is different from the second upper frequency or the first lower frequency is different from the second lower frequency;
      in response to the detection that the first operating bandwidth and the second operating bandwidth are at least partially different, cause at least a first access point of the first network to initiate a procedure to change at least one operating bandwidth of a set comprising the first operating bandwidth and the second operating bandwidth so that the operating bandwidths of the first network and the second network are the same after the change.

11. The apparatus of claim 10, wherein the apparatus is applicable to the first access point, and wherein the at least one memory and the computer program code are configured, with the at least one processor, to cause the apparatus to:
    cause the first access point to transmit to a second access point of the second network a request to change the second operating bandwidth of the second network to match with the first operating bandwidth of the first network.

12. The apparatus of claim 10, wherein the apparatus is an interworking network apparatus configuring operation of the first network and the second network, and wherein the at least one memory and the computer program code are configured, with the at least one processor, to cause the apparatus to instruct the first access point to change its first operating bandwidth so that the operating bandwidths of the first network and the second network are the same after the change.

13. The apparatus of claim 10, wherein the at least one memory and the computer program code are configured, with the at least one processor, to cause the apparatus to operate according to IEEE 802.11 wireless local area network specifications.

14. The apparatus of claim 10, wherein the at least one memory and the computer program code are configured, with the at least one processor, to cause the apparatus to configure the first network to operate on a frequency band operable by a primary radio system, and wherein the procedure to change at least one operating bandwidth of the set operates to avoid utilization of frequency bands currently used by the primary radio system in a geographical area of the first network.

15. The apparatus according to claim 10, wherein after the procedure to change the at least one operating bandwidth, frequency channels of the first network are overlapping with frequency channels of the second network.

16. The apparatus of claim 10 where the first operating bandwidth comprises the entire frequency bandwidth over which the first network operates, and where the second operating bandwidth comprises the entire frequency bandwidth over which the second network operates.

17. The apparatus of claim 16 where the procedure causes frequency end points of the first operating bandwidth and the second operating bandwidth to become aligned.

18. The non-transitory program storage device as in claim 17 where the first operating bandwidth comprises the entire frequency bandwidth over which the first network operates, and where the second operating bandwidth comprises the entire frequency bandwidth over which the second network operates.

19. The non-transitory program storage device as in claim 18 where the procedure causes frequency end points of the first operating bandwidth and the second operating bandwidth to become aligned.

20. The non-transitory program storage device as in claim 17 where the procedure causes frequency end points of the first operating bandwidth and the second operating bandwidth to become aligned.

21. The apparatus of claim 10 where the procedure causes frequency end points of the first operating bandwidth and the second operating bandwidth to become aligned.

22. A non-transitory program storage device readable by a machine, tangibly embodying a program of instructions executable by the machine for performing operations, the operations comprising:

detecting presence of a first network and a second network on overlapping frequency bands;

determining a first operating bandwidth of the first network, where the first operating bandwidth comprises a first upper frequency and a different first lower frequency;

determining a second operating bandwidth of the second network, where the second operating bandwidth comprises a second upper frequency and a different second lower frequency;

determining that the first operating bandwidth and the second operating bandwidth are at least partially different, where the determining that the first operating bandwidth and the second operating bandwidth are at least partially different comprises at least one of determining that the first upper frequency is different from the second upper frequency or determining that the first lower frequency is different from the second lower frequency;

in response to the determining that the first operating bandwidth and the second operating bandwidth are at least partially different, causing at least a first access point of the first network to initiate a procedure to change at least one operating bandwidth of a set comprising the first operating bandwidth and the second operating bandwidth so that the operating bandwidths of the first network and the second network are the same after the change.

* * * * *